(12) United States Patent
Myers et al.

(10) Patent No.: US 11,138,093 B2
(45) Date of Patent: Oct. 5, 2021

(54) IDENTIFYING DATA INCONSISTENCIES AND DATA CONTENTION BASED ON HISTORIC DEBUGGING TRACES

(71) Applicant: Microsoft Technology Licensing, LLC, Redmond, WA (US)

(72) Inventors: Del Myers, Seattle, WA (US); Jackson Michael Davis, Carnation, WA (US); Thomas Lai, Redmond, WA (US); Andrew R Sterland, Issaquah, WA (US); Deborah Chen, Seattle, WA (US); Patrick Lothian Nelson, Redmond, WA (US); Jordi Mola, Bellevue, WA (US); Juan Carlos Arevalo Baeza, Bellevue, WA (US); James M Pinkerton, Kirkland, WA (US); Leslie Yvette Richardson, Seattle, WA (US); Kenneth Walter Sykes, Oakton, VA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 185 days.

(21) Appl. No.: 16/398,672

(22) Filed: Apr. 30, 2019

(65) Prior Publication Data
US 2020/0349053 A1 Nov. 5, 2020

(51) Int. Cl.
*G06F 9/44* (2018.01)
*G06F 11/36* (2006.01)
(Continued)

(52) U.S. Cl.
CPC ........ *G06F 11/3636* (2013.01); *G06F 9/4881* (2013.01); *G06F 16/2365* (2019.01)

(58) Field of Classification Search
CPC . G06F 11/3636; G06F 16/2365; G06F 9/4881
See application file for complete search history.

(56) References Cited

U.S. PATENT DOCUMENTS 6,405,326 B1 * 6/2002 Azagury ............... G06F 9/4881
714/38.1
9,934,126 B1 4/2018 Mola et al.
(Continued)

OTHER PUBLICATIONS

Cui, et al., "REPT: Reverse Debugging of Failures in Deployed Software", In Proceedings of the 13th USENIX Symposium on Operating Systems Design and Implementation, Oct. 8, 2018, pp. 17-32.
(Continued)

*Primary Examiner* — Hang Pan
(74) *Attorney, Agent, or Firm* — Workman Nydegger (57) ABSTRACT

Identifying and reporting potential data inconsistencies and/or potential data contentions based on historic debugging traces. Based on replay of a thread, some implementations observe an influx of a value to a memory cell, and determine whether the value of the memory cell observed from the influx is inconsistent with a prior value of the memory cell as known by the thread. If so, these implementations can initiate an indication of a data inconsistency. Based on replay of a plurality of threads, other implementations identify a memory cell that was accessed by a first thread while a thread synchronization mechanism was active on the first thread. Then, if there was another access to the memory cell by a second thread without use of the thread synchronization mechanism, these implementations might initiate an indication of a potential data contention.

20 Claims, 7 Drawing Sheets

(51) Int. Cl.
*G06F 16/23* (2019.01)
*G06F 9/48* (2006.01)

(56) References Cited

U.S. PATENT DOCUMENTS

| | | | |
|---|---|---|---|
| 2005/0216798 A1* | 9/2005 | Yu | G06F 9/526 714/718 |
| 2005/0283781 A1* | 12/2005 | Karp | G06F 11/3624 718/100 |
| 2007/0168968 A1* | 7/2007 | Bates | G06F 11/3632 717/124 |
| 2010/0122073 A1* | 5/2010 | Narayanaswamy | G06F 9/4812 712/244 |
| 2012/0030657 A1* | 2/2012 | Gao | G06F 9/524 717/128 |
| 2014/0089642 A1* | 3/2014 | Gottschlich | G06F 9/3851 712/220 |
| 2014/0157039 A1* | 6/2014 | Peck | G06F 11/07 714/2 |
| 2017/0126580 A1* | 5/2017 | Lo | H04L 43/026 |

OTHER PUBLICATIONS

Liu, et al., "iReplayer: In-situ and Identical Record-and-Replay for Multithreaded Applications", In Proceedings of the 39th ACM SIGPLAN Conference on Programming Language Design and Implementation, Apr. 4, 2018, pp. 344-358.

Machado, et al., "CoopREP: Cooperative Record and Replay of Concurrency Bugs", In Journal of Software Testing, Verification and Reliability vol. 28 Issue 1, Sep. 5, 2017, 27 Pages.

"International Search Report and Written Opinion Issued in PCT Application No. PCT/US20/026052", dated Sep. 8, 2020, 21 Pages.

Sankova, et al., "Record and Replay of Multithreaded Applications", In Report of University of Lisboa, Jan. 1, 2015, 21 Pages.

Vilk, et al., "McFly: Time-Travel Debugging for the Web", In the Repository of arXiv:1810.11865v1, Oct. 28, 2018, 13 Pages.

* cited by examiner

IDENTIFYING DATA INCONSISTENCIES AND DATA CONTENTION BASED ON HISTORIC DEBUGGING TRACES

CROSS-REFERENCE TO RELATED APPLICATIONS

Not Applicable.

BACKGROUND

Tracking down and correcting bugs in software code (often referred to as "debugging" code) is a core activity in software development. Software bugs can lead to many undesired runtime behaviors, such as execution crashes, runtime exceptions, slow execution performance, incorrect data results, data corruption, and the like. Many hard to reproduce software bugs lead to data inconsistencies during code execution. Some developer mistakes leading to these bugs include forgetting to initialize variables, or introducing race conditions in which various threads modify data without correctly guarding that data using thread synchronization/locking mechanisms (e.g., through proper use of mutexes, events, semaphores, spin locks, queue spin locks, and the like). During code execution, these data inconsistency bugs manifest as values in memory being read in the context of a particular thread, when that thread did not, itself, write the given value to memory. In the example of uninitialized memory, a thread reads from memory that has not written to prior. In the case of race conditions, a thread reads a value that it had not previously seen in memory, or it had not written to memory.

One approach developers have used to debug code is to use "live" debuggers. In general, a live debugger attaches to a live process's execution and enables a developer to monitor and guide that process's forward execution. For example, a live debugger may enable a developer to set a breakpoint that pauses the program's execution when it reaches particular instruction, to set a watchpoint that pauses the program's execution when it accesses a particular memory addresses, to single-step through lines of code as it executes, etc.

An emerging form of diagnostic tools enable "historic" debugging (also referred to as "time travel" or "reverse" debugging), in which the execution of at least a portion of a program's thread(s) is recorded/traced into one or more trace files (i.e., a trace). Using some tracing techniques, a trace can contain very high-fidelity "bit-accurate" historic trace data, which enables the recorded portion(s) the traced thread(s) to be virtually "replayed" at great fidelity—even down to the granularity of individual instructions (e.g., machine code instructions, intermediate language code instructions, etc.). Thus, using bit-accurate trace data, a "historic," "time travel," or "reverse" debugger enables a developer to not only monitor and guide a forward emulation of traced code (e.g., via breakpoints, watchpoints, single-stepping, etc.), but to also monitor and guide a reverse emulation of traced code (e.g., via reverse breakpoints, reverse watchpoints, reverse single-stepping, etc.). Thus, a developer can monitor and guide execution of any part of a programs prior trace.

BRIEF SUMMARY

At least some embodiments described herein identify and report potential data inconsistencies and/or potential data contentions based on historic debugging traces. For example, embodiments might include identifying and reporting actual data consistencies that occurred during a program's prior execution, and which were captured during tracing. Thus, these embodiments are capable of identifying when reads from uninitialized memory or data race conditions actually occurred and were captured during tracing. In these embodiments, execution of a thread is replayed from a historic trace. During this replay, an influx to a memory cell is observed. If that is inconsistent with a prior value of the memory cell as known by the thread (e.g., because the thread was unaware of the memory cell's value, or the observed value is different from a known prior value), a data inconsistency has been observed.

Other embodiments might include identifying situations were a data contention could occur, even if an actual data inconsistency was not captured during tracing. Thus, these embodiments can identify situations in which data race conditions could occur, even if an actual data race condition was not captured during tracing. In these embodiments, execution of a plurality of threads is replayed from a historic trace. Memory accesses by a first thread are tracked while a thread synchronization mechanism is active on the first thread. If there is a memory access to a tracked memory cell by a second thread when this thread synchronization mechanism is not active on the second thread, a potential data contention has been observed.

Some embodiments include methods, systems, and computer program products for indicating a data inconsistency observed during a prior execution of a thread. These embodiments include replaying a prior execution of a thread based on a trace representing the prior execution of the thread. These embodiments also include, based on replaying the prior execution of the thread, observing an influx of a value to a memory cell. These embodiments also include determining that the value of the memory cell observed from the influx is inconsistent with a prior value of the memory cell as known by the thread. These embodiments also include, based at least on the value of the memory cell observed from the influx being consistent with the prior value of the memory cell, initiating an indication of a data inconsistency.

Other embodiments include methods, systems, and computer program products for indicating a potential data contention based on a trace of prior thread execution. These embodiments include replaying prior execution of a plurality of threads based on a trace representing the prior execution of the plurality of threads. These embodiments also include, based on replaying the prior execution of the plurality of threads, identifying activation of a thread synchronization mechanism during a prior execution of a first thread of the plurality of threads. These embodiments also include, based on replaying the prior execution of the plurality of threads, and based on the activation of the thread synchronization mechanism, identifying at least one memory cell that was accessed by the first thread while the thread synchronization mechanism was active on the first thread. These embodiments also include, based on replaying the prior execution of the plurality of threads, identifying a memory access to the at least one memory cell, during a prior execution of a second of the plurality of threads, without use of the thread synchronization mechanism by the second thread. These embodiments also include, based on identifying the memory access, initiating an indication of a potential data contention in connection with the at least one memory cell.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein identify and report potential data inconsistencies and/or potential data contentions based on historic debugging traces. For example, embodiments might include identifying and reporting actual data consistencies that occurred during a program's prior execution, and which were captured during tracing. Thus, these embodiments are capable of identifying when reads from uninitialized memory or data race conditions actually occurred and were captured during tracing. In these embodiments, execution of a thread is replayed from a historic trace. During this replay, an influx to a memory cell is observed. If that is inconsistent with a prior value of the memory cell as known by the thread (e.g., because the thread was unaware of the memory cell's value, or the observed value is different from a known prior value), a data inconsistency has been observed.

Other embodiments might include identifying situations were a data contention could occur, even if an actual data inconsistency was not captured during tracing. Thus, these embodiments can identify situations in which data race conditions could occur, even if an actual data race condition was not captured during tracing. In these embodiments, execution of a plurality of threads is replayed from a historic trace.

As will be appreciated in view of the disclosure herein, use of historic debugging traces to automatically identify data inconsistencies and data contentions can greatly improve the speed and effectiveness of the debugging process, and can result in the elimination of data inconsistencies and data races from application code. In addition, the embodiments described herein can provide unique debugging functionality, such as automatically identifying/flagging data inconsistencies and contentions in a trace as trace index data, and/or automatically identifying/flagging data inconsistencies and contentions via user interface mechanisms.

Figure 1A:
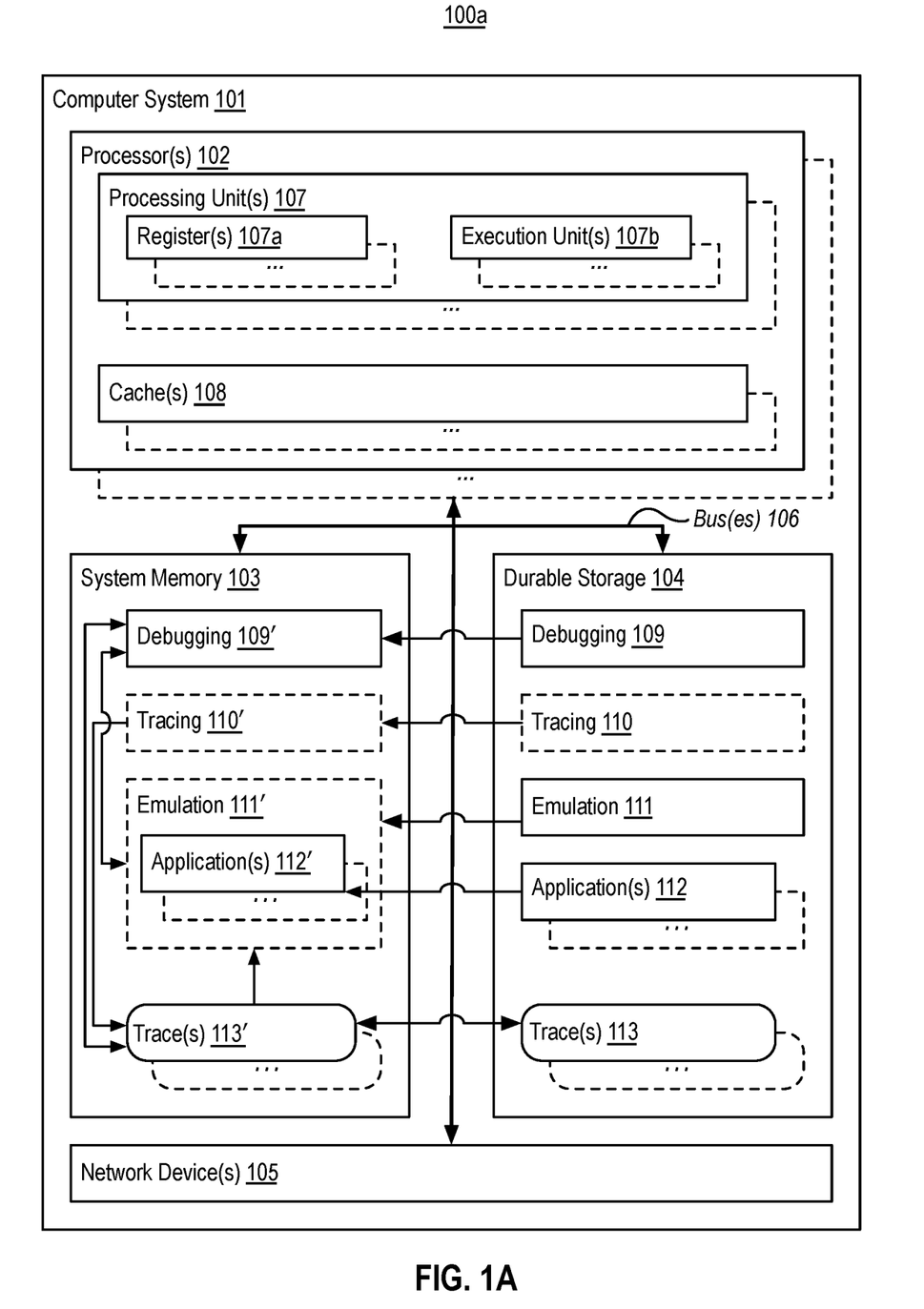
FIG. 1A illustrates an example computing environment that facilitates identifying and reporting potential data inconsistencies and/or potential data contentions based on historic debugging traces.

FIG. 1A illustrates an example computing environment 100a that identifying and reporting potential data inconsistencies and/or potential data contentions based on historic debugging traces. as depicted, computing environment 100a may comprise or utilize a special-purpose or general-purpose computer system 101, which includes computer hardware, such as, for example, one or more processors 102, system memory 103, durable storage 104, and/or network device(s) 105, which are communicatively coupled using one or more communications buses 106.

Embodiments within the scope of the present invention can include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media (e.g., system memory 103 and/or durable storage 104) that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network device(s) 105), and then eventually transferred to computer system RAM (e.g., system memory 103) and/or to less volatile computer storage media (e.g., durable storage 104) at the computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, machine code instructions (e.g., binaries), intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

As shown in FIG. 1A, each processor 102 can include (among other things) one or more processing units 107 (e.g., processor cores) and one or more caches 108. Each processing unit 107 loads and executes machine code instructions via the caches 108. During execution of these machine code instructions at one more execution units 107b, the instructions can use internal processor registers 107a as temporary storage locations and can read and write to various locations in system memory 103 via the caches 108. In general, the caches 108 temporarily cache portions of system memory 103; for example, caches 108 might include a "code" portion that caches portions of system memory 103 storing application code, and a "data" portion that caches portions of system memory 103 storing application runtime data. If a processing unit 107 requires data (e.g., code or application runtime data) not already stored in the caches 108, then the processing unit 107 can initiate a "cache miss," causing the needed data to be fetched from system memory 103—while potentially "evicting" some other data from the caches 108 back to system memory 103.

As illustrated, the durable storage 104 can store computer-executable instructions and/or data structures representing executable software components; correspondingly, during execution of this software at the processor(s) 102, one or more portions of these computer-executable instructions and/or data structures can be loaded into system memory 103. For example, the durable storage 104 is shown as storing computer-executable instructions and/or data structures corresponding to a debugging component 109, a tracing component 110, an emulation component 111, and one or more application(s) 112. The durable storage 104 can also store data, such as one or more trace(s) 113 that represent one or more executions of one or more of the application(s) 112.

In general, the debugging component 109 takes one or more of the trace(s) 113 as input and, based on analysis of those trace(s) 113, identifies data inconsistencies and/or potential data contentions, which might correspond to reads from uninitialized memory and/or potential data race conditions. After identifying a data inconsistency and/or potential data contention, the debugging component 109 can initiate an indication of the inconsistency/contention, such as by initiating the creation of trace index data, and/or initiating a visual indication of the inconsistency/contention at a debugging user interface. Thus, FIG. 1A shows that the debugging component 109 and the trace(s) 113 are loaded into system memory (i.e., debugging component 109' and trace(s) 113'), and a double-ended arrow between the debugging component 109' and the trace(s) 113' indicates that the debugging component 109' can read from, and potentially write to, those trace(s) 113'; if data is written to trace(s) 113', this data might also be persisted to the trace(s) 113 in durable storage 104.

As mentioned, the debugging component 109 performs analysis on trace(s) 113. In embodiments this analysis may include one or both of a static analysis or a dynamic analysis. As used herein, a static analysis comprises the debugging component 109 performing the analysis based on data read from the trace(s) 113 only. A dynamic analysis, on the other hand, can use data that is generated/obtained from a replay/emulation of application(s) 112 based on those trace(s) 113. Thus, FIG. 1A shows that the emulation component 111 may also be loaded into system memory 103 (i.e., emulation component 111'), and that the application(s) 112 may be emulated by the emulation component 111' (i.e., application(s) 112'). A double-ended arrow between the debugging component 109' and emulation component 111' indicates that the debugging component 109' can request trace emulation by the emulation component 111', and that the emulation component 111' can provide results of that trace emulation to the debugging component 109'.

If present, the tracing component 110 can record or "trace" execution of one or more of application(s) 112 into the trace(s) 113. The tracing component 110 can record execution of application(s) 112 whether that execution be on the processor(s) 102 directly, whether that execution be on the processor(s) 102 via a managed runtime. Thus, FIG. 1A also shows that the tracing component 110 may be loaded into system memory 103 (i.e., tracing component 110'). An arrow between tracing component 110' and trace(s) 113' indicates that the tracing component 111' can record trace data into trace(s) 113' (which might then be persisted to the durable storage 104 as trace(s) 113).

Figure 2:
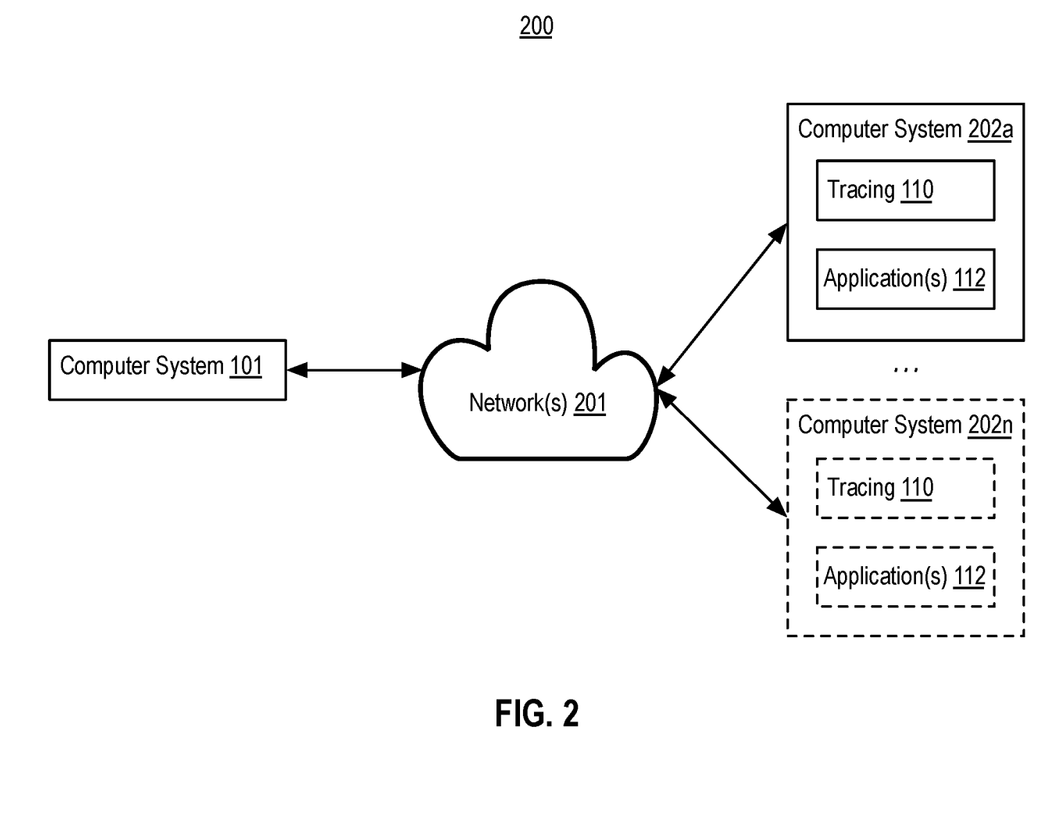
FIG. 2 illustrates an example in which the computing environment of FIG. 1A is networked with one or more other computer systems.

Computer system 101 might additionally, or alternatively, receive one or more of the trace(s) 113 from another computer system (e.g., using network device(s) 105). For example, FIG. 2 illustrates an example computing environment 200 in which computer system 101 of FIG. 1A is connected to one or more other computer systems 202 (i.e., computer systems 202a-202n) over one or more networks 201. As shown in example 200, each computer system 202 includes a tracing component 110 and application(s) 112. As such, computer system 101 may receive, over the network(s) 201, one or more trace(s) 113 of prior execution(s) of one or more of application(s) 112 at these computer system(s) 202.

It is noted that, while the debugging component 109, the tracing component 110, and/or the emulation component 111 might each be independent components or applications, they might alternatively be integrated into the same application (such as a debugging suite), or might be integrated into another software component—such as an operating system component, a hypervisor, a cloud fabric, etc. As such, those skilled in the art will also appreciate that the invention may be practiced in a cloud computing environment of which computer system 101 is a part.

In embodiments, the debugging component 109, the tracing component 110, and/or the emulation component 111 operate on trace(s) 113 that comprise high-fidelity bit-accurate trace data representing a prior execution of one or more threads of an application 112, and in which the trace data enables any traced portion(s) of those thread(s) to be emulated (i.e., "replayed") by the emulation component 111 down to the granularity of individual instructions (e.g., machine code instructions, intermediate language code instructions, etc.). As used herein, a "bit accurate" trace is a trace that includes sufficient data to enable code of an application 112 that was previously executed (e.g., at computer system 101 and/or at one or more of computer systems 202), to be replayed via emulation by the emulation component 111, such that the emulation component 111 simulates execution of this code in substantially the same manner as it executed prior. There are a variety of approaches that the tracing component 110 might use to record and represent bit-accurate trace data. Two different families of approaches that provide high levels of performance and reasonable trace size are now briefly summarized, though it will be appreciated that the embodiments herein create and operate on traces recorded using other approaches. Additionally, optimizations could be applied to either of these families of approaches that, for brevity, are not described herein.

A first family of approaches is built upon the recognition that processor instructions (including virtual machine "virtual processor" instructions) generally fall into one of three categories: (1) instructions identified as "non-deterministic" as not producing predictable outputs because their outputs are not fully determined by data in general registers (e.g., registers 107a) or a cache (e.g., cache(s) 108), (2) deterministic instructions whose inputs do not depend on memory values (e.g., they depend only on processor register values, or values defined in the code itself), and (3) deterministic instructions whose inputs depend on reading values from memory. Thus, in some embodiments, storing enough state data to reproduce the execution of instructions can be accomplished by addressing: (1) how to record non-deterministic instructions that produce output not fully determined by their inputs, (2) how to reproduce the values of input registers for instructions depending on registers, and (3) how to reproduce the values of input memory for instructions depending on memory reads.

In some embodiments, the first approach(es) record into the trace(s) 113 the execution of non-deterministic instructions that produce output not fully determined by their inputs by storing into the trace(s) 113 the side-effects of execution of such instructions. As used herein, "non-deterministic" instructions can include somewhat less common instructions that (i) produce non-deterministic output each time they are executed (e.g., RDTSC on INTEL processors, which writes the number of processor cycles since the last processor reset into a register), that (ii) may produce a deterministic output, but depend on inputs not tracked during trace recording (e.g. debug registers, timers, etc.), and/or that (iii) produce processor-specific information (e.g., CPUID on INTEL processors, which writes processor-specific data into registers). Storing the side-effects of execution of such instructions may include, for example, storing register values and/or memory values that were changed by execution of the instruction. In some architectures, such as from INTEL, processor features such as those found in Virtual Machine eXtensions (VMX) could be used to trap instructions for recording their side effects into the trace(s) 113.

Addressing how to reproduce the values of input registers for deterministic instructions (e.g., whose inputs depend only on processor register values) is straightforward, as they are the outputs of the execution of the prior instruction(s). Thus, the first approach(es) for recording traces can therefore reduce recording the execution of an entire series of processor instructions to storing data that can be used to reproduce the register values at the beginning of the series. In embodiments, the trace(s) 113 may not even need store a record of which particular instructions executed in the series, or the intermediary register values. This is because the actual instructions are available from the application code, itself. These instructions can therefore be supplied the recorded inputs (i.e., the recorded initial set of register values) during reply, to execute in the same manner as they did during the trace.

Finally, the first approach(es) for recording traces can address how to reproduce the values of input memory for deterministic instructions whose inputs depend on memory values by recording into the trace(s) 113 the memory values that these instructions consumed (i.e., the reads)—irrespective of how the values that the instructions read were written to memory. In other words, some trace(s) 113 might record the values of memory reads, but not memory writes. For example, although values may be written to memory by a current thread, by another thread (including the kernel, e.g., as part of processing an interrupt), or by a hardware device, it is just the values that the thread's instructions read that are needed for full replay of instructions of the thread that performed the reads. This is because it is those values that were read by the thread (and not necessarily all the values that were written to memory) that dictated how the thread executed.

A second family of approaches for recording bit-accurate traces is built on the recognition that a processor (e.g., processor 102) forms a semi- or quasi-closed system. For example, once portions of data for a process (i.e., code data and runtime application data) are loaded into cache(s) 108, processor 102 can run by itself—without any input—as a semi- or quasi-closed system for bursts of time. In particular, once the cache(s) 108 are loaded with data, one or more of processing units 107 execute instructions from a code portion of the cache(s) 108, using runtime data stored in a data portion of the cache(s) 108 and using the registers 107a. When a processing unit 107 needs some influx of information (e.g., because an instruction it is executing, will execute, or may execute accesses code or runtime data not already in the cache(s) 108), a "cache miss" occurs and that information is brought into the cache(s) 108 from system memory 103. The processing unit 107 can then continue execution using the new information in the cache(s) 108 until new information is again brought into the cache(s) 108 (e.g., due to another cache miss or an un-cached read). Thus, in the second family of approaches, the tracing component 110 might record sufficient data to be able to reproduce the influx of information into the cache(s) 108 as a traced processing unit executes.

The debugging component 109, the tracing component 110, and/or the emulation component 111 operate on trace(s) 113 created using other historic debugging techniques as well. For example, another class of historic debugging technology, referred to herein as "branch trace debugging," relies on reconstructing at least part of an entity's execution based on working backwards from a dump or snapshot (e.g., a crash dump of a thread) that includes a processor branch trace (i.e., which includes a record of whether or not branches were taken). These technologies start with values (e.g., memory and register) from this dump or snapshot and, using the branch trace to partially determine code execution flow, iteratively replay the entity's code instructions and backwards and forwards in order to reconstruct intermediary data values (e.g., register and memory) used by this code until those values reach a steady state. These techniques may be limited in how far back they can reconstruct data values, and how many data values can be reconstructed. Nonetheless, the reconstructed historical execution data can be used for historic debugging.

Yet another class of historic debugging technology, referred to herein as "snapshot and replay debugging," periodically record full snapshots of an entity's memory space and processor registers while it executes. If the entity relies on data from sources other than the entity's own memory, or from a non-deterministic source, these technologies might also record such data along with the snapshots. These technologies then use the data in the snapshots to replay the execution of the entity's code between snapshots. Notably, in order to have correct replay of a process' execution, "snapshot and replay" technologies sometimes require that multiple threads be serialized onto a single processing unit 107.

Figure 3:
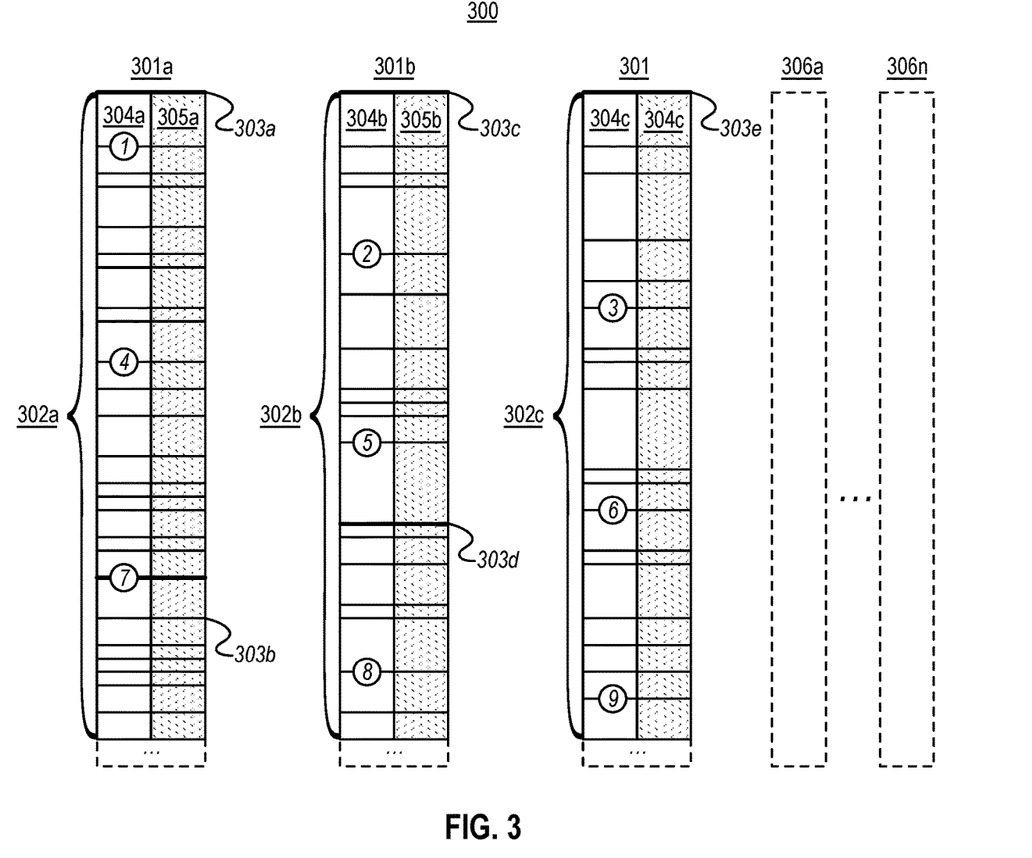
FIG. 3 illustrates one example of a historic debugging trace.

FIG. 3 illustrates one example of a trace 300, which might correspond to one or more of trace(s) 113 of FIG. 1A, and which could be created in accordance with one or more of the foregoing tracing techniques, such as the bit-accurate tracing techniques described above. In the example of FIG. 3, trace 300 includes one or more trace data streams 301. In FIG. 3, three trace data streams 301 are illustrated (i.e., trace data streams 301a-301c). In embodiments, each trace data stream 301 represents execution of a different thread executed from the code of an application 112. For example, trace data stream 301a might represent execution of a first thread of an application 112, trace data stream 301b might represent execution of a second thread of an application 112, and trace data stream 301c might represent third thread of that application 112. As shown, each trace data stream 301 comprises a plurality of data packets 302 (i.e., data packet 302a for data steam 301a, data packets 302b for data stream 301b, and data packets 302c for data stream 301c). Since the particular data logged in each data packet 302 might vary, they are shown as having varying sizes. In general, when using bit-accurate tracing technologies, each data packet 302 represents at least the inputs (e.g., register values, memory values, cache line data, etc.) to one or more executable instructions that executed as part of this first thread of the application 112. As shown, the trace data streams 301 might also include one or more key frames 303 (e.g., key frames 303a-303e) that each represents sufficient information, such as a snapshot of register and/or memory values, that enables the prior execution of the thread containing the key frame to be replayed by the emulation component 111 starting at the point of the key frame 303 forwards. In addition, trace data stream 301 might include one or more sequencing events, shown in FIG. 3 as circles numbered 1-9. While each trace data stream 301 generally traces a given thread independently, sequencing events represent the occurrence of events that are orderable across the threads. These sequencing events may correspond, for example, to events in which threads interact, such as through shared memory, via function calls, etc. While, for simplicity, the order of events in trace data streams 301 rotate through the threads a round-robin manner, it will be appreciated that they would typically appear in a less predictable manner.

In embodiments, a trace 113 might also include the actual code that was executed. Thus, in FIG. 3, each data packet 302 is shown as including a non-shaded data inputs portion 304 (i.e., data inputs portion 304a for data packets 302a, data inputs portion 304b for data packets 302b, and data inputs portion 304c for data packets 302c) and a shaded code portion 305 (i.e., code portion 305a for data packets 302a, code portion 305b for data packets 302b, and code portion 305c for data packets 302c). In embodiments, the code portion 305 in the packets 302 might include the executable instructions that executed based on the corresponding data inputs. In other embodiments, however, a trace 113 might omit the actual code that was executed, instead relying on having separate access to the code of the application 112 (e.g., from durable storage 104). In these other embodiments, each data packet may, for example, specify an address or offset to the appropriate executable instruction(s). As shown, a trace 113 might include any number of additional data streams 306 (i.e., data streams 306a-306n), which can store any type of additional trace data. This additional trace data may include, for example, indexing data such as occasional memory snapshots, reverse-lookup data structures for quickly locating memory addresses/values in the trace data streams 301, etc.

Figure 1B:
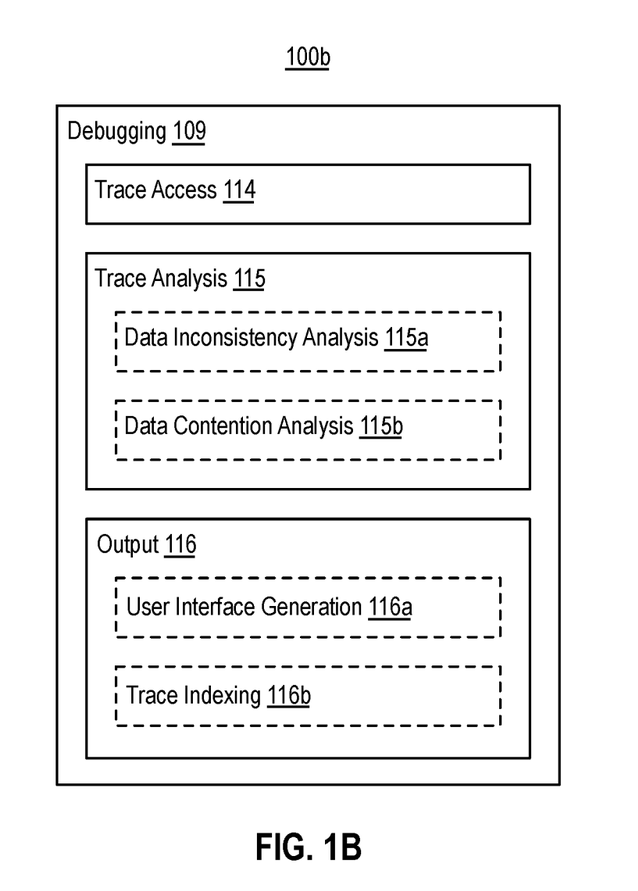
FIG. 1B illustrates additional detail of a debugging of FIG. 1A.

FIG. 1B illustrates an example 100b that provides additional detail of the debugging component 109 of FIG. 1A. The depicted debugging component 109 in FIG. 1B includes a variety of sub-components (e.g., trace access 114, trace analysis 115, output 116, etc.) that represent various functionalities that the debugging component 109 might implement in accordance with various embodiments described herein. It will be appreciated that the depicted components—including their identity, sub-components, and arrangement—are presented merely as an aid in describing various embodiments of the debugging component 109, and that these components/sub-components are non-limiting to how software and/or hardware might implement various embodiments of the debugging component 109, or of the particular functionality thereof.

The trace access component 114 accesses at least one of the trace(s) 113. This could mean accessing trace(s) 113 from durable storage 104, and/or accessing trace(s) 113 from another computer system (e.g., one or more of computer systems 202). In embodiments, accessing a trace 113 causes that trace to be loaded, at least in part, into system memory 103 (i.e., as shown by trace(s) 113').

The trace analysis component 115 performs one or more types of analysis on the accessed trace(s) 113 to identify actual, or potential, reads from uninitialized memory and/or data race conditions. As shown, the trace analysis component 115 might include a data inconsistency analysis component 115a which identifies, from a trace 113, situations when a traced thread read a value from a memory cell that is inconsistent with that thread's knowledge of the memory cell's prior value (e.g., because the thread had no knowledge of the memory cell's prior value, or because the thread previously read or wrote that prior value to the memory cell). These situations could correspond to a read from uninitialized memory (i.e., when the thread had no knowledge of the memory cell's prior value), or could correspond to a data race that was actually captured in the trace 113 (i.e., when the value read from the memory cell is inconsistent with a value that the thread previously read from or wrote to the memory cell). Thus, the data inconsistency analysis component 115a can identify reads from uninitialized memory and/or potential data races that actually occurred during tracing.

Figure 4A:
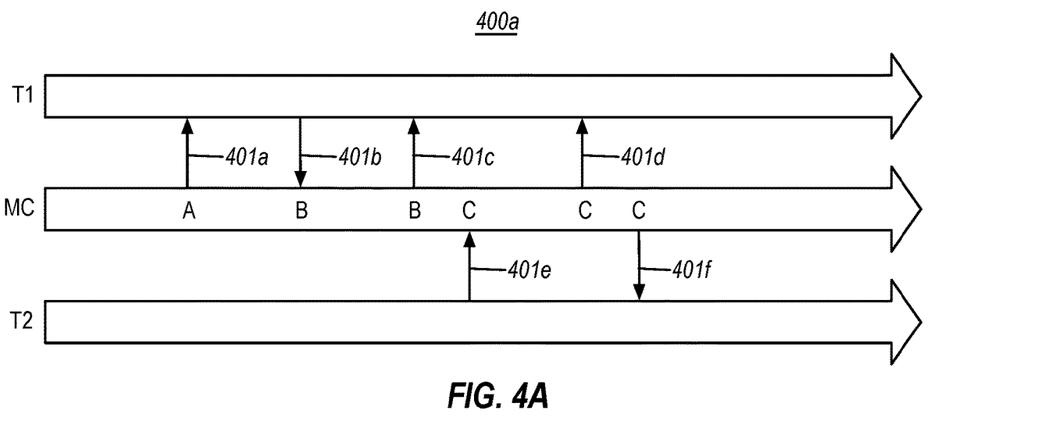
FIG. 4A illustrates an example timing diagram that includes two timelines corresponding to execution of two threads, as well as a timeline showing those thread's access to a memory cell, including a read from uninitialized memory and a data inconsistency.

To illustrate these concepts, FIG. 4A shows an example timing diagram 400a that includes two timelines (i.e., T1 and T2) corresponding to execution of two threads, as well as a timeline (i.e., MC) showing those thread's access to a memory cell. Timing diagram 400a could, for example, correspond to execution of two threads whose prior execution is represented in one or more accessed traces 113. Based on timeline 400a, the data inconsistency analysis component 115a might identify a read from uninitialized memory (i.e., at arrow 401a). In particular, the first interaction with the memory cell by thread T1 was at arrow 401a, where thread T1 read the value A. Since this read was thread T1's first interaction with to the memory cell, the thread had no prior knowledge of the value of the memory cell. For instance, thread T1 made no prior write to the memory cell, which would place a known value in the memory cell. Thus, when thread T1 read the value A from the memory cell at arrow 401a, this read value (i.e., A) was likely an uninitialized value of the memory cell.

In addition, based on timing diagram 400a, the data inconsistency analysis component 115a might identify a read that was a potential data race (i.e., at arrow 401d). In particular, timing diagram 400a shows that, after this first read, thread T1 wrote the value B to the memory cell (i.e., at arrow 401b) and then read the value B from the memory cell (i.e., at arrow 401c). Since the value read at arrow 401c (i.e., B) was consistent with thread T1's prior knowledge of the memory cell's value (i.e., B, which was written at arrow 401b), there was no data inconsistency. However, as shown, at arrow 401e thread T2 later wrote the value C to the memory cell, and thread T1 then read this same value at arrow 401d. Here, the value read at arrow 401d (i.e., C) was consistent with thread T1's prior knowledge of the memory cell's value (i.e., B, which was read at arrow 401c). As such, there was a data inconsistency at arrow 401d, which could have been a data race.

Notably, the data inconsistency analysis component 115a might also analyze thread T2 for data inconsistencies and find none. For example, the first interaction with the memory cell by thread T2 was at arrow 401e, where thread T2 wrote the value C. Since this first interaction was a write, this could not have been a read from uninitialized memory. Later, thread T2 read that same value at arrow 401f. Since the value read at arrow 401f was consistent with the value written at arrow 401e, there was no data inconsistency at arrow 401f.

As mentioned, "snapshot and replay" technologies might require that multiple threads be serialized onto a single processing unit 107. If this is the case, the data inconsistency analysis component 115a might be limited to detecting accesses to uninitialized data, but not other data inconsistencies (i.e., since thread serialization would force consistency).

Additionally, or alternatively, the trace analysis component 115 might include a data contention analysis component 115b which identifies, from a trace 113, situations in which (i) one traced thread protected access to a memory cell using a thread synchronization mechanism, in which (ii) another traced thread accessed that memory cell without taking control of that same thread synchronization mechanism, and in which (iii) at least one of the threads' access to the memory cell was a write. In these situations, a data race could be possible, even if one was not actually captured in the trace 113. Thus, the data contention analysis component 115b can identify situations in which a data race/contention could occur.

As will be appreciated by one of ordinary skill in the art, thread synchronization mechanisms (sometimes referred to as thread synchronization primitives, thread locking mechanisms, thread locking primitives, and the like) are techniques that create "critical sections" in a thread's execution to protect shared memory during multithreaded execution. Some thread synchronization mechanisms are pessimistic, while others are optimistic. In general, pessimistic thread synchronization mechanisms assume that a race condition will probably occur if multiple threads interact with the same memory location(s) concurrently, and thus prevent critical sections on different threads from executing concurrently (i.e., when the threads could concurrently access the same memory location(s)). Examples of pessimistic thread synchronization mechanisms include spinlocks, mutexes, and semaphores.

A spinlock causes a thread trying to acquire it to wait in a loop (i.e., to "spin") while repeatedly checking if a lock is available. Once acquired, spinlocks are usually be held by a thread until they are explicitly released by the thread, although in some implementations they may be automatically released if the thread being waited on (the one which holds the lock) blocks. A mutex grants exclusive access to the shared resource to only one thread. If a first thread acquires a mutex, a second thread that wants to acquire that mutex is suspended until the first thread releases the mutex. A semaphore controls access to a resource, and is created with a maximum count and in initial count. This count is decremented each time a thread enters the semaphore, and is incremented when a thread releases the semaphore. When the count is zero, subsequent requests block until other threads release the semaphore. When all threads have released the semaphore, the count is at the maximum value specified when the semaphore was created.

Optimistic thread synchronization mechanisms, on the other hand, let the critical sections on different threads execute concurrently and monitor the memory location(s) accessed during the critical sections to determine if a data race occurred; if a race does occur, these mechanisms "roll back" these threads' execution by rolling back their side-effects (e.g., register and memory values changed by their execution) and then re-execute the critical sections single-threaded. Examples of optimistic thread synchronization mechanisms include hardware or software-implemented transactional memory (e.g., the TSX-NI extensions to the x86 instruction set architecture (ISA)).

Figure 4B:
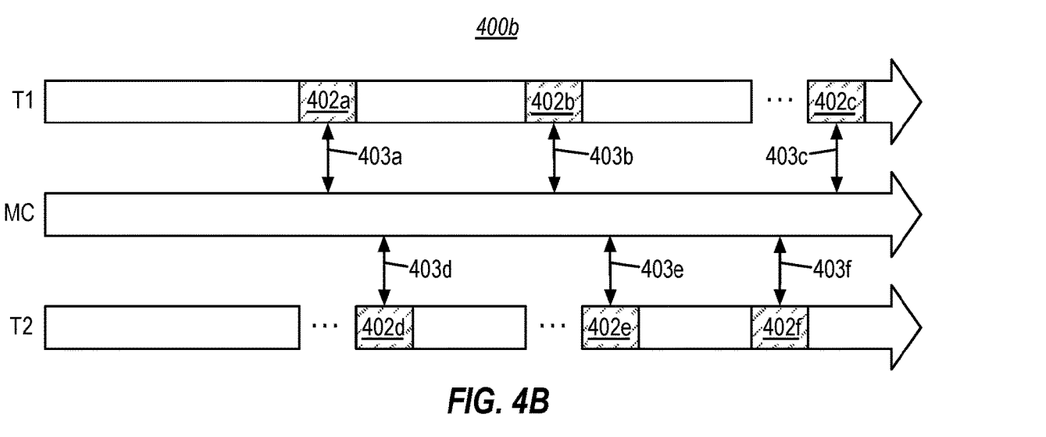
FIG. 4B illustrates an example timing diagram that includes two timelines corresponding to execution of two threads, as well as a timeline showing those thread's access to a memory cell, including use of critical sections to protect accesses to a memory cell.
Figure 4C:
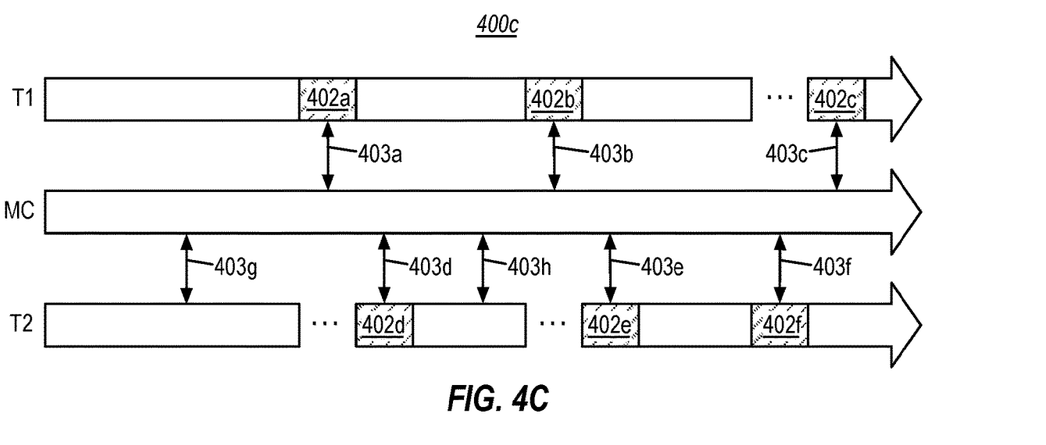
FIG. 4C illustrates an example timing diagram that includes two timelines corresponding to execution of two threads, as well as a timeline showing those thread's access to a memory cell, including use of critical sections to protect accesses to a memory cell, and including a potential data race on the memory cell.

To illustrate the concepts of thread synchronization, FIG. 4B shows an example timing diagram 400*b* that includes two timelines (i.e., T1 and T2) corresponding to execution of two threads, as well as a timeline (i.e., MC) showing those thread's access to a memory cell. Timing diagram 400*b* could, for example, correspond to execution of two threads whose prior execution is represented in one or more accessed traces 113. Each thread in timing diagram 400*b* might execute from the same code, and are shown as repeatedly executing a "critical section" in that code (i.e., sections 402*a*-402*f* in the execution of threads T1 and T2) created by some thread synchronization mechanism. As shown using ellipses in FIG. 4B, one thread enters the critical section by using locking techniques (e.g., a mutex) when it needs to access the shared resource and other thread has to wait to get its turn to enter into the critical section. This prevents contentions when these threads access the same memory cells. As shown by the arrows 403*a*-403*f*, in FIG. 4B, each thread accesses (reads from and/or writes to) the memory cell only during the critical sections, and thus the critical sections protect against data races on the memory cell. FIG. 4C, on the other hand, includes additional arrows 403*g* and 403*h*, showing accesses to the memory cell (e.g., each corresponding to a read from and/or a write to the memory cell) without use of the critical section. Since these accesses were performed without the use of a critical section, they could potentially cause a data race on the memory cell. The data contention analysis component 115*b* can identify such memory accesses as potential contentions.

In embodiments, the data contention analysis component 115*b* may treat accesses (e.g., the one at arrow 403*g*) to a memory location that occur prior to an initial synchronization primitive protected access (e.g., the one at arrow 403*a*), differently than it does later accesses (e.g., the ones at arrows 403*d*, 403*b*, 403*e*, 403*c*, 403*f*, and 403*g*). In doing so, the data contention analysis component 115*b* may reduce false-positives, such as those that could occur when the traced code initializes complex data structures that are only later protected by the synchronization primitive. Thus, for example, the data contention analysis component 115*b* might determine that the access at arrow 403*h* is a potential contention, while it might determine that access at arrow 403*g* is not a potential contention. Alternatively, the data contention analysis component 115*b* might determine that access at arrow 403*g* has a lower probability of being a potential contention than the access at arrow 403*h*.

The output component 116 produces output indicative of any data inconsistency identified by the data inconsistency analysis component 115*a* and/or of any data contention identified by the data contention analysis component 115*b*. In embodiments, the output component 116 might produce an output by writing data to a trace file, or causing data to be written to a trace file (e.g., one of trace(s) 113). For example, the output component 116 might write (or cause to be written) index data that supplements the accessed trace 113 (e.g., as part of one of additional data streams 306) to indicate one or more execution times represented in the trace 113 where a data inconsistency and/or contention occurred, to indicate one or more code elements associated with the data inconsistency/contention, and the like. In embodiments, the output component 116 might produce an output by sending output data and/or signal(s) to another software component (e.g., via an API call). In embodiments, the output component 116 might produce an output by displaying data at a user interface, or causing data to be displayed at a user interface (e.g., a debugger user interface). For example, the output component 116 might cause a debugger user interface to display a visual indication a visual indication along an execution timeline that indicates when the data inconsistency/contention occurred, to display a visual indication of one or more code elements associated with the data inconsistency/contention, and the like.

The following discussion new refers to a number of methods and method acts that may be performed by computer system 101. Although the method acts may be discussed in a certain orders or may be illustrated in a flow chart as occurring in a particular order, no particular ordering is required unless specifically stated, or required because an act is dependent on another act being completed prior to the act being performed.

Figure 5:
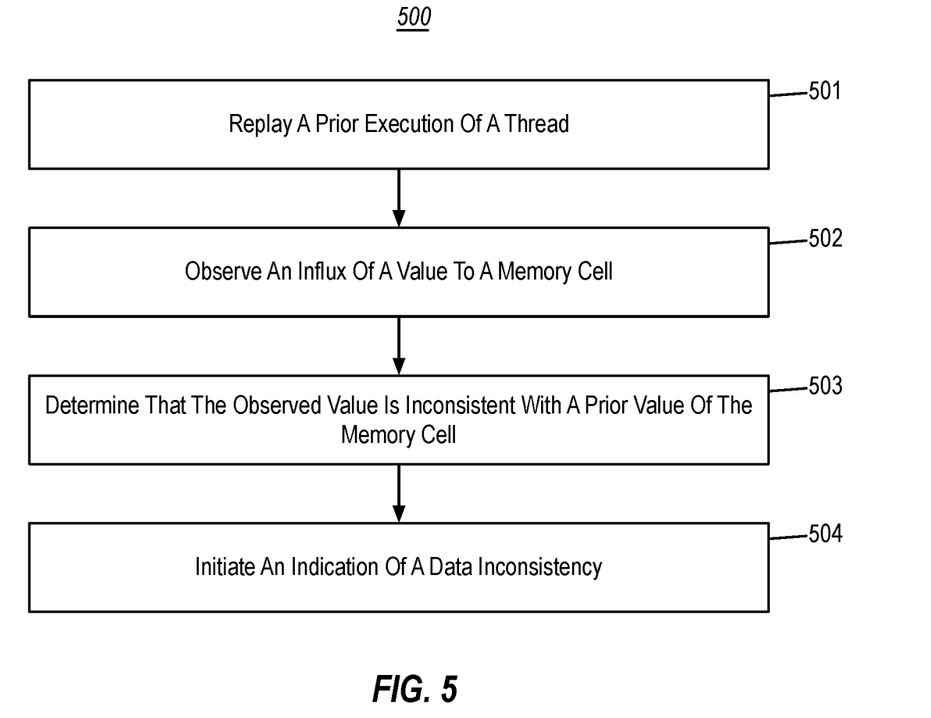
FIG. 5 illustrates a flowchart of an example method for indicating a data inconsistency observed during a prior execution of a thread.

In order to better understand at least the analysis by the data inconsistency analysis component 115*a*, FIG. 5 illustrates a flowchart of an example method 500 for indicating a data inconsistency observed during a prior execution of a thread. Method 500 is now described with reference to FIGS. 1A, 1B, 3, 4A, and 5.

As shown, method 500 includes an act 501 of replaying a prior execution of a thread. In some implementations, act 501 comprises replaying a prior execution of a thread based on a trace representing the prior execution of the thread. For example, the emulation component 111 can replay a prior execution of thread T1, for which a timeline of execution is represented in FIG. 4A. In embodiments, this emulation might be performed at the request of the data inconsistency analysis component 115*a*, however it might alternatively be performed for some other reason—such as for general debugging of application 112 at a debugger. As part of this emulation, the emulation component 111 can replay one or more of the memory accesses to the memory cell represented in FIG. 4A, such as one or more of the memory accesses represented at arrows 401a-401c and 401d.

Method 500 also includes an act 502 of observing an influx of a value to a memory cell. In some implementations, act 502 comprises, based on replaying the prior execution of the thread, observing an influx of a value to a memory cell. For example, based on the emulation by the emulation component 111, the data inconsistency analysis component 115a might observe an influx of the value A at the execution time point corresponding to arrow 401a, an influx of the value B at the execution time point corresponding to arrow 401c, and/or and influx of the value C at the execution time point corresponding to arrow 401d.

Method 500 also includes an act 503 of determining that the observed value is inconsistent with a prior value of the memory cell. In some implementations, act 503 comprises determining that the value of the memory cell observed from the influx is inconsistent with a prior value of the memory cell as known by the thread. For example, for each influx is observed, the data inconsistency analysis component 115a can determine whether or not the observed influx is consistent with a prior known value of the memory cell to which the influx corresponds. As will be appreciated, observing the influx of the value to the memory cell could comprise processing a trace data packet (e.g., one of data packets 302a) indicating that the memory cell stores the value.

For instance, if the observed influx is the value A at the execution time point corresponding to arrow 401a, the data inconsistency analysis component 115a might determine that the influx is inconsistent with a prior value of the memory cell as known by the thread. This is because the thread knew no prior value of the memory cell. In this case, the influx at the execution time point corresponding to arrow 401a might be a read from uninitialized memory.

In situations such as the influx at arrow 401a (e.g., a read from uninitialized memory), it will be appreciated that, when determining that the value of the memory cell observed from the influx is inconsistent with the prior value of the memory cell as known by the thread in act 503, implementations of act 503 could comprise determining that the prior value of the memory cell is not known to the thread, based at least on the thread having not previously written to the memory cell.

Alternatively, if the observed influx is the value C at the execution time point corresponding to arrow 401d, the data inconsistency analysis component 115a might determine that the influx is inconsistent with a prior value of the memory cell as known by the thread. The data inconsistency analysis component 115a might make this determination based on the read by thread T1 of the value B to the memory cell at the execution time point corresponding to arrow 401c (which read may have been replayed by the emulation component 111 in act 501). Since thread T1 most recently read the value B from the memory cell, and since the value read at the execution time point corresponding to arrow 401d was the value C, this value is inconsistent with the thread's prior knowledge of the memory cell's value. In this case, the influx at the execution time point corresponding to arrow 401d might be a data race (i.e., against a write by thread T2 at the execution time point corresponding to arrow 401e). As will be appreciated, the write of the value C by thread T2 might be traced (e.g., because execution of thread T2 was also traced as being related to thread T1), or it might not be traced (e.g., because execution of thread T2 was not traced as not being selected for tracing and/or as not being related to thread T1). If execution of thread T2 was traced, method 500 might also include an analysis of thread T2 that determines when the thread T2 wrote the value to the memory cell.

In situations such as the influx at arrow 401d (e.g., a potential race condition), it will be appreciated that, when determining that the value of the memory cell observed from the influx is inconsistent with the prior value of the memory cell as known by the thread in act 503, implementations of act 503 could comprise first determining that the prior value of the memory cell is known to the thread based on at least one of (i) the thread having previously read the prior value from the memory cell, or (ii) the thread having previously written the prior value to the memory cell, and then determining that the value of the memory cell observed from the influx is different from the prior value of the memory cell.

Although not expressly shown in FIG. 5, the data inconsistency analysis component 115a might determine that the influx of the value B at the execution time point corresponding to arrow 401c is consistent with a prior value of the memory cell as known by the thread. The data inconsistency analysis component 115a might make this determination based on the write by thread T1 of the value B to the memory cell at the execution time point corresponding to arrow 401b (which write may have been replayed by the emulation component 111 in act 501). Since, at the execution time point corresponding to arrow 401c, thread T1 most recently wrote the value B to the memory cell (i.e., arrow 401b), and since the value read at the execution time point corresponding to arrow 401c was also the value B, this value is consistent with the thread's prior knowledge of the memory cell's value.

Method 500 also includes an act 504 of initiating an indication of a data inconsistency. In some implementations, act 504 comprises, based at least on the value of the memory cell observed from the influx being consistent with the prior value of the memory cell, initiating an indication of a data inconsistency. For example, based on having identified an inconsistency in connection with the influxes at arrow 401a and/or arrow 401d, the output component 116 can initiate one or more indications of those inconsistencies. These indications could be at a user interface (e.g., using the user interface generation component 116a), in a trace file (e.g., using the trace indexing component 116b), and/or to some other software component. Depending on the type of inconsistency identified in act 503, the indication of the data inconsistency might indicate that the data inconsistency corresponds to at least one of (i) a read from uninitialized memory, or (ii) a potential race condition.

Thus, in implementations of act 504, initiating the indication of the data inconsistency could comprise at least one of (i) initiating the creation of trace index data that indicates the data inconsistency (e.g., as part of an additional data stream 306 in a trace 113), or (ii) initiating a visual indication of the data inconsistency at a debugging user interface. If act 504 includes initiating the creation of trace index data, the trace index data could include, for example, one or more execution times represented in the trace 113 where a data inconsistency and/or contention occurred, one or more code elements associated with the data inconsistency/contention, and the like. If act 504 includes initiating the visual indication of the data inconsistency at the debugging user interface, the visual indication could include, for example, at least one of (i) a visual indication along an execution timeline that indicates when the data inconsistency occurred, or (ii) a visual indication of one or more code elements associated with the data inconsistency. These code elements (e.g., variables, data structures, commands, instructions, etc.) might be accessed on thread T1 (e.g., one or more code elements relating to the reads at arrows 104a and/or 104d), and/or might be part of thread T2 (e.g., one or more code elements relating to the write at arrow 104e, which caused a data inconsistency in thread T1). Thus, in act 504, the thread could comprise a first thread, and the one or more code elements associated with the data inconsistency could include one or more of (i) a first code element from the first thread, or (ii) a second code element from a second thread whose prior execution is also traced.

While method 500 has been described primarily in connection with an analysis of thread T1, it will be appreciated that method 500 could also be applied to perform a similar data inconsistency analysis of thread T2. However, method 500 might not actually identify any data inconsistencies within thread T2.

Figure 6:
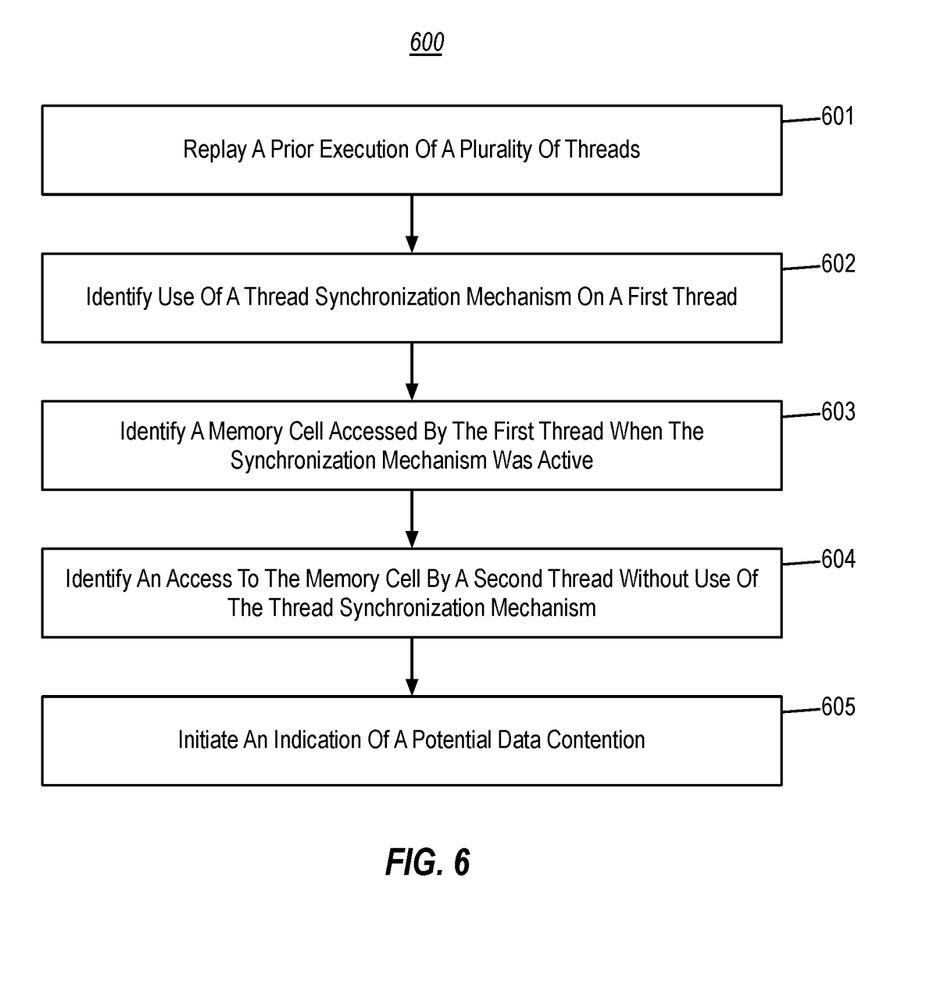
FIG. 6 illustrates a flowchart of an example method for indicating a potential data contention based on a trace of prior thread execution.

In order to better understand at least the analysis by the data contention analysis component 115b, FIG. 6 illustrates a flowchart of an example method 600 for indicating a potential data contention based on a trace representing prior thread execution. Method is now described with reference to FIGS. 1A, 1B, 3, 4C, and 6.

As shown, method 600 includes an act 601 of replaying a prior execution of a plurality of threads. In some implementations, act 601 comprises replaying prior execution of a plurality of threads based on a trace representing the prior execution of the plurality of threads. For example, the emulation component 111 can replay a prior execution of threads T1 and T2, for which timelines of execution are represented in FIG. 4C. In embodiments, this emulation might be performed at the request of the data contention analysis component 115b, however it might alternatively be performed for some other reason—such as for general debugging of application 112 at a debugger. As part of this emulation, the emulation component 111 can replay one or more of the memory accesses (i.e., one or more of the memory accesses at the execution time points corresponding to arrows 403a-403h) to the memory cell represented in FIG. 4C. This could include, for example, replaying the memory access(es) at arrow 403a and the memory access(es) at arrow 403h.

Method 600 also includes an act 602 of identifying use of a thread synchronization mechanism of a first thread. In some implementations, act 602 comprises, based on replaying the prior execution of the plurality of threads, identifying activation of a thread synchronization mechanism during a prior execution of a first thread of the plurality of threads. For example, based on replay of thread T1 by the emulation component 111, the data contention analysis component 115b might identify entry of critical section 402a on thread T1. This entry could include, for example, thread T1 calling a function, setting a variable, etc. that initiates entry or activation of a spinlock, a mutex, a semaphore, a transaction, or some other thread synchronization mechanism.

Method 600 also includes an act 603 of identifying a memory cell accessed by the first thread when the synchronization mechanism was active. In some implementations, act 603 comprises, based on replaying the prior execution of the plurality of threads, and based on the activation of the thread synchronization mechanism, identifying at least one memory cell that was accessed by the first thread while the thread synchronization mechanism was active on the first thread. For example, based on the memory access(es) represented by arrow 403a during critical section 402a, the data contention analysis component 115b might identify the memory cell represented in FIG. 4C as being accessed during a critical section, and as therefore being protected by the critical section. Notably, the data contention analysis component 115b might additionally, or alternatively, use one or more of the memory access(es) at arrows 403b and/or 403c to identify the memory cell, since these accesses to the memory cell were also performed during critical sections 402b and 402c.

Method 600 also includes an act 604 of identifying access to the memory cell by a second thread without use of the thread synchronization mechanism. In some implementations, act 604 comprises, based on replaying the prior execution of the plurality of threads, identifying a memory access to the at least one memory cell, during a prior execution of a second of the plurality of threads, without use of the thread synchronization mechanism by the second thread. For example, the data contention analysis component 115b might identify the memory access(es) at arrow 403h as having been performed by thread T2 outside of a critical section, and that they are therefore a data race risk.

Notably, the data contention analysis component 115b might also recognize one or more of the memory access(es) to the memory cell at arrows 402d-402f, but determine that they were part of critical sections 402d-402f and that they therefore present no data race risk. In embodiments, such access within a synchronization-primitive protected region may cause an indication to be stored of increased probability that the accessed memory cell requires future access to also be protected by the same primitive(s). This tracking state may, in some implementations, be reset upon de-allocation of the associated memory cell (e.g., if tracked the cell as allocated via a call to malloc( ), this tracking state may be removed upon the cell's allocation being free'd via a call to free( )). In embodiments, tracking state for a memory cell might be a binary value (e.g., a "0" if there were no accesses within a synchronization-primitive protected region, or a "1" if there was), though it could alternatively be something more granular (e.g., a value that is incremented with each synchronization-primitive protected access, where a larger value indicates a greater probability).

Method 600 also includes an act 605 of initiating an indication of a potential data contention. In some implementations, act 605 comprises, based on identifying the memory access, initiating an indication of a potential data contention in connection with the at least one memory cell. For example, based on having identified the data race risk in connection with the memory access(es) at arrow 403h, the output component 116 can initiate one or more indications of a potential data contention. Similar to the embodiments described in connection with method 500, these indications could be at a user interface (e.g., using the user interface generation component 116a), in a trace file (e.g., using the trace indexing component 116b), and/or to some other software component.

Thus, in implementations of act 605, initiating the indication of the potential data contention could comprises at least one of (i) initiating the creation of trace index data that indicates the potential data contention (e.g., as part of an additional data stream 306 in a trace 113), or (ii) initiating a visual indication of the potential data contention at a debugging user interface. If act 605 includes initiating the creation of trace index data, the trace index data could include, for example, one or more execution times represented in the trace 113 where a potential data contention occurred, one or more code elements associated with the potential data contention, and the like. If act 605 includes initiating the visual indication of the potential data contention at the debugging user interface the visual indication could include, for example, at least one of (i) a visual indication along an execution timeline that indicates when the potential data contention occurred, or (ii) a visual indication of one or more code elements associated with the potential data contention. These code elements (e.g., variables, data structures, commands, instructions, etc.) might be part of thread T1 (e.g., one or more code elements relating to the accesses at arrows 403*a*-403*c*), and/or might be part of thread T2 (e.g., one or more code elements relating to the access at arrow 403*f,* which caused the potential data contention. Thus, in act 605, the thread could comprise a first thread, and the one or more code elements associated with the data contention could include one or more of (i) a first code element from the first thread, or (ii) a second code element from a second thread whose prior execution is also traced.

Notably, different thread synchronization mechanisms might enforce different requirements as to whether all memory reads and/or writes must be performed within critical sections, or whether some of those reads and/or writes might be permissible outside of a critical section. In other words, a reading thread and a writing thread might have different requirements. Thus, prior to initiating the indication of the potential data contention, the data contention analysis component 115*b* might determine whether or not the memory access(es) at arrow 403*h* actually violated the requirements of the thread synchronization mechanism that was used. Accordingly, prior to act 605, method 600 might include an act (not depicted) of determining if the access by the second thread violated the thread synchronization mechanism. In implementations, this act might comprise determining whether or not the memory access to the at least one memory cell by the second thread violated a memory access restriction of the thread synchronization mechanism used by the first thread. Thus, method 600 might initiate the indication of the potential data contention in act 605 based on having determined that the memory access did violate the memory access restriction. Accordingly, method 600 might filter out possible "false positives" prior to initiating an indication of a potential data contention.

For example, a hardware transaction might require that threads performing writes utilize critical sections, but might permit threads performing reads to do so without critical sections. Accordingly, the memory access(es) at arrow 403*h* might actually only be a potential data contention if they include one or more writes. Thus, in method 600, if the thread synchronization mechanism comprises a hardware transaction, then determining whether or not the memory access to the at least one memory cell by the second thread violated a memory access restriction of the thread synchronization mechanism used by the first thread might comprise determining that the memory access was a write that didn't use the hardware transaction.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements.

What is claimed:

1. A method, implemented at a computer system that includes one or more processors, for indicating a data inconsistency observed during a prior execution of a thread, the method comprising:
   replaying a prior execution of a thread based on a trace representing the prior execution of the thread;
   based on replaying the prior execution of the thread, observing an influx of a value of a memory cell, the influx comprising an interaction between the thread and the value of the memory cell at an execution time point in the replaying of the prior execution of the thread;
   determining that the value of the memory cell observed from the influx is inconsistent with a prior value of the memory cell as known by the thread at the execution time point in the replaying of the prior execution of the thread; and
   based at least on the value of the memory cell observed from the influx being inconsistent with the prior value of the memory cell, initiating an indication of a data inconsistency.

2. The method of claim 1, wherein determining that the value of the memory cell observed from the influx is inconsistent with the prior value of the memory cell as known by the thread comprises:
   determining that the prior value of the memory cell is known to the thread based on at least one of (i) the thread having previously read the prior value from the memory cell, or (ii) the thread having previously written the prior value to the memory cell; and
   determining that the value of the memory cell observed from the influx is different from the prior value of the memory cell.

3. The method of claim 2, wherein initiating the indication of the data inconsistency comprises initiating an indication of a potential race condition.

4. The method of claim 1, wherein determining that the value of the memory cell observed from the influx is inconsistent with the prior value of the memory cell as known by the thread comprises determining that the prior value of the memory cell is not known to the thread, based at least on the thread having not previously written to the memory cell.

5. The method of claim 4, wherein initiating the indication of the data inconsistency comprises initiating an indication of a read from uninitialized memory.

6. The method of claim 1, wherein observing the influx of the value to the memory cell comprises processing a trace data packet indicating that the memory cell stores the value.

7. The method of claim 1, wherein the thread comprises a first thread, and wherein the value was written to the memory cell by a second thread during a prior execution of the second thread.

8. The method of claim 7, wherein the prior execution of the second thread is also traced, and wherein the method further comprises determining when the second thread wrote the value to the memory cell.

9. The method of claim 1, wherein initiating the indication of the data inconsistency comprises at least one of (i) initiating the creation of trace index data that indicates the data inconsistency, or (ii) initiating a visual indication of the data inconsistency at a debugging user interface.

10. The method of claim 1, wherein initiating the indication of the data inconsistency comprises initiating a visual indication of the data inconsistency at a debugging user interface, and wherein the visual indication of the data inconsistency at the debugging user interface includes at least one of (i) a visual indication along an execution timeline that indicates when the data inconsistency occurred, or (ii) a visual indication of one or more code elements associated with the data inconsistency.

11. The method of claim 1, wherein the thread comprises a first thread, and wherein initiating the indication of the data inconsistency comprises initiating an indication one or more code elements associated with the data inconsistency, the one or more code elements including one or more of (i) a first code element from the first thread, or (ii) a second code element from a second thread whose prior execution is also traced.

12. The method of claim 1, wherein the indication of the data inconsistency indicates that the data inconsistency corresponds to at least one of (i) a read from uninitialized memory, or (ii) a potential race condition.

13. A method, implemented at a computer system that includes one or more processors, for indicating a potential data contention based on a trace representing prior thread execution, the method comprising:
replaying prior execution of a plurality of threads based on a trace representing the prior execution of the plurality of threads;
based on replaying the prior execution of the plurality of threads,
identifying activation of a thread synchronization mechanism on a first thread of the plurality of threads during a prior execution of the first thread of the plurality of threads;
based on the activation of the thread synchronization mechanism on the first thread, identifying at least one memory cell that was accessed by the first thread while the thread synchronization mechanism was active on the first thread; and
identifying a memory access to the at least one memory cell by a second thread of the plurality of threads, during a prior execution of a second of the plurality of threads, without use of the thread synchronization mechanism by the second thread; and
based on identifying the memory access to the at least one memory cell by the second thread without use of the thread synchronization mechanism by the second thread, initiating an indication of a potential data contention in connection with the at least one memory cell.

14. The method of claim 13, further comprising determining whether or not the memory access to the at least one memory cell by the second thread violated a memory access restriction of the thread synchronization mechanism used by the first thread, and wherein the method initiates the indication of the potential data contention based on having determined that the memory access did violate the memory access restriction.

15. The method of claim 14, wherein the thread synchronization mechanism comprises a hardware transaction, and wherein determining whether or not the memory access to the at least one memory cell by the second thread violated a memory access restriction of the thread synchronization mechanism used by the first thread comprises determining that the memory access was a write that didn't use the hardware transaction.

16. The method of claim 13, wherein the thread synchronization mechanism comprises one of a spin lock, a semaphore, or a mutex.

17. The method of claim 13, wherein initiating the indication of the potential data contention comprises at least one of (i) initiating the creation of trace index data that indicates the potential data contention, or (ii) initiating a visual indication of the potential data contention at a debugging user interface.

18. The method of claim 13, wherein initiating the indication of the potential data contention comprises initiating a visual indication of the potential data contention at a debugging user interface, and wherein the visual indication of the potential data contention at the debugging user interface includes at least one of (i) a visual indication along an execution timeline that indicates when the potential data contention occurred, or (ii) a visual indication of one or more code elements associated with the potential data contention.

19. A computer system comprising:
at least one processor; and
at least one computer-readable media having stored thereon computer-executable instructions that are executable by the at least one processor to cause the computer system to indicate a potential data contention based on a trace representing prior thread execution, the computer-executable instructions including instructions that are executable by the at least one processor to at least:
replay prior execution of a plurality of threads based on a trace representing the prior execution of the plurality of threads;
based on replaying the prior execution of the plurality of threads,
identify activation of a thread synchronization mechanism on a first thread of the plurality of threads during a prior execution of the first thread of the plurality of threads;
based on the activation of the thread synchronization mechanism on the first thread, identify at least one memory cell that was accessed by the first thread while the thread synchronization mechanism was active on the first thread; and
identify a memory access to the at least one memory cell, during a prior execution of a second of the plurality of threads, without use of the thread synchronization mechanism by the second thread; and
based on identifying the memory access to the at least one memory cell by the second thread without use of the thread synchronization mechanism by the second thread, initiate an indication of a potential data contention in connection with the at least one memory cell.

20. The computer system of claim 19, wherein the computer-executable instructions also include instructions that are executable by the at least one processor determine whether or not the memory access to the at least one memory cell by the second thread violated a memory access restriction of the thread synchronization mechanism used by the first thread, and wherein the computer system initiates the indication of the potential data contention based on having determined that the memory access did violate the memory access restriction.

* * * * *